United States Patent Office 2,770,944
Patented Nov. 20, 1956

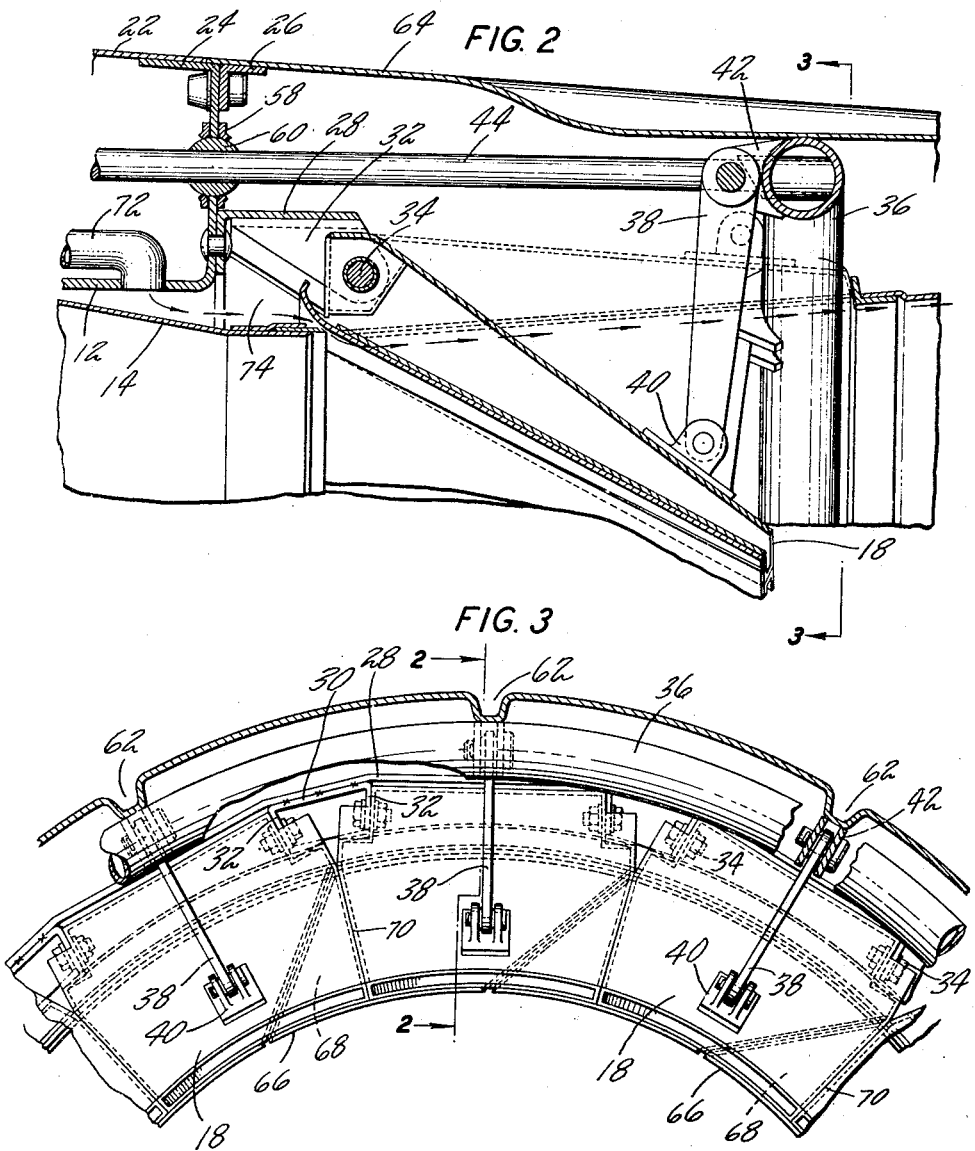

2,770,944

VARIABLE AREA REACTION NOZZLE MOVABLE FROM CONVERGENT TO CONVERGENT-DIVERGENT FORM

Donald J. Jordan, Glastonbury, Conn., assignor to United Aircraft Corporation, East Hartford, Conn., a corporation of Delaware Application April 26, 1952, Serial No. 284,511

19 Claims. (Cl. 60—35.6)

This invention relates to jet engines and more particularly to propelling nozzle for a turbojet engine.

In many turbojet engines the jet from the nozzle approaches, or at certain times exceeds, a velocity equal to the speed of sound. An object of this invention is to provide a propelling nozzle which will be a convergent nozzle during a flow of the exhaust gases at a subsonic velocity relative to the nozzle and a convergent-divergent nozzle during a flow of the exhaust gases at a supersonic velocity relative to the nozzle.

On a turbojet engine which may be equipped with an after-burner, it is frequently desirable to provide a variable area exhaust nozzle at the downstream end of the afterburner. This exhaust nozzle will then provide a small area nozzle during nonafterburner operation and a large jet area when the afterburner is in operation.

An object of this invention is to provide a variable area thrust nozzle which can be varied in contour to give optimum thrust generation at all flight speeds.

An object of this invention is to provide an exhaust nozzle which can be positioned to provide a small exhaust area during non-afterburner operation and to a large exhaust area during afterburner operation.

An object of this invention is to provide a nozzle which will accomplish the above objects and, which, for each position of the nozzle, will provide a substantially circular exhaust area.

An object of this invention is to provide a means of cooling the propelling nozzle and its associated parts during afterburner operation.

An object of this invention is to provide a nozzle for an exhaust duct of a turbojet engine or afterburner which for each position of the nozzle will provide an opening which is substantially in one plane perpendicular to the axis of the duct.

An object of this invention is to provide a nozzle of minimum weight.

Fig. 2 is a view in section on line 2—2 of Fig. 3.

Fig. 3 is a view in section on line 3—3 of Fig. 2.

Figure 1:
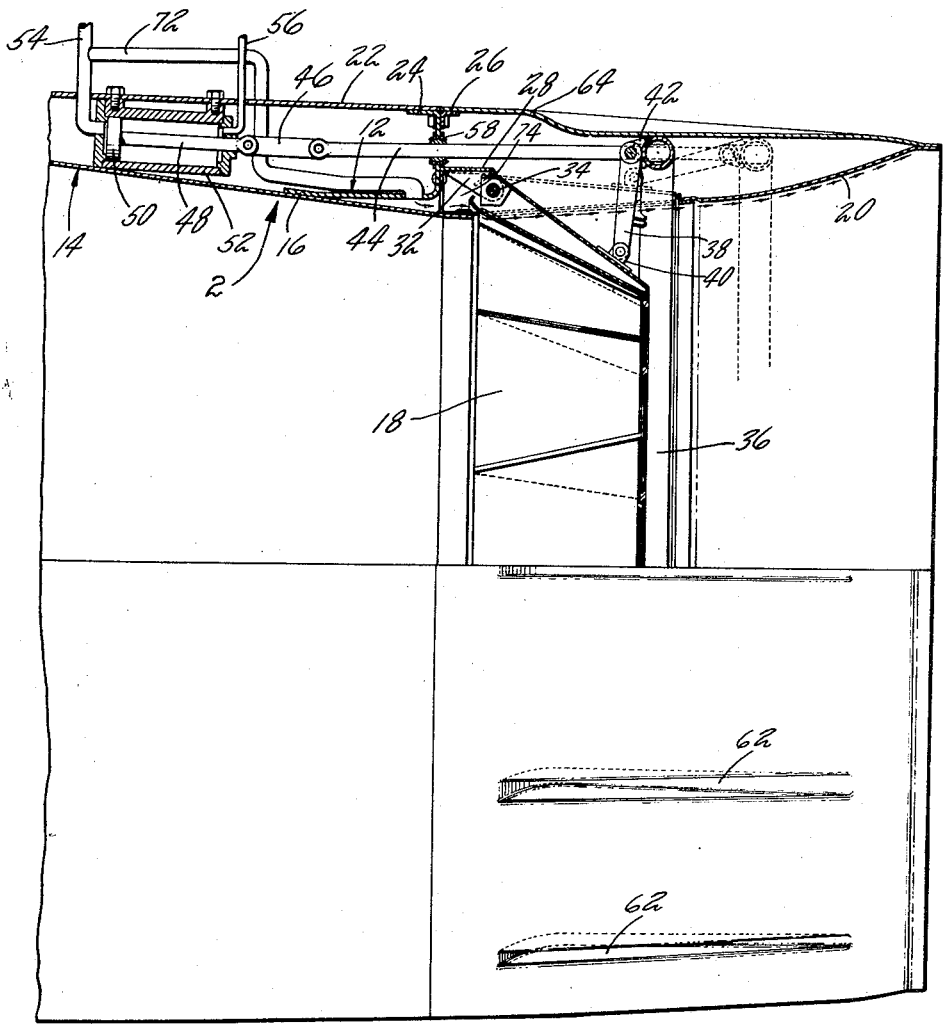
Fig. 1 is a view of the propelling nozzle, with parts partially in section.

Referring to Fig. 1, the nozzle is shown on the downstream end of exhaust duct or afterburner 2 from a turbojet engine. The nozzle consists of a series of overlapping flaps 18, support ring member 12 for these flaps, convergent exhaust duct 14 upstream of the ring 12 and divergent exhaust duct 20 downstream of the ring 12 and duct 14 a distance substantially the length of flaps 18. It will be noted that the upstream area of the divergent duct 20 is greater than the downstream area of convergent duct 14. Support ring members 12 which is U-shaped in section is integrally attached at its forward end to convergent exhaust duct 14 by integral flange 16 and at its opposite end through integral flange 24 to outer duct 22 and support web 26.

A support ring 28 is integrally attached to ring member 12 and has a series of hinge attachment fixtures 30 attached to it. Fixtures 30 are so spaced about ring 28 that adjacent nozzle flaps 18 are attachable in hinged relation to the leg members 32 of fixtures 30. Flaps 18 are hinged to leg members 32 of fixtures 30 as by means of bolts 34. As the downstream ends of flaps 18 there is a surrounding actuating ring 36 movable axially for opening or closing the flaps.

The end of each flap remote from the hinge is attached to nozzle actuating ring 36 through links 38, pivotally connected to brackets 40 on flap 18 and brackets 42 on actuating ring 36. By means of the above described series of connections, flap 18 can be caused to move from its closed position as shown in dotted lines in Fig. 1 by the movement of actuating ring 36 which, through link 38, causes flap 18 to pivot about bolts 34. As shown in phantom in Figs. 1 and 2, flap 18 forms a smooth inner surface connecting convergent exhaust duct 14 and divergent exhaust duct 20. As further shown in Figs. 1 and 2, flaps 18, when in their outer position, as shown in phantom, form a divergent duct, with the free ends of flaps 18 blending with divergent duct 20 to form a continuous divergent duct therewith and such that convergent duct 14, flaps 18 and divergent duct 20 form a smooth convergent-divergent exhaust nozzle.

Actuating ring 36 is caused to move by actuating rods 44, which through link rods 46 and 48 are attached to actuating piston 50. Piston 50 is located in actuating cylinder 52 and is caused to move within cylinder 52 by means of pressurized fluid being introduced to one side or the other of piston 50 through tubes 54 and 56. As piston 50 is moved by the pressurized fluid, it causes actuating rod 44 to move actuating ring 36. Actuating rod 44 is supported in ring member 12 at self aligning joint 58 which carries spherical seat 60. Actuating ring 36 is guided and supported by a series of axially extending flutes 62 in rear outer duct 64.

Referring to Fig. 3, flaps 18 are of spaced double wall construction and provide an interflap sealing arragement, by the attachment of curved sheet 66 to the inner surface of flap 18. Sheet 66 has a triangular portion 68 which extends beyond flap 18 and seals adjacent edges 70 of flaps 18 as the nozzle is moved to its open position.

When the afterburner is in operation, cooling air is provided to the inner surfaces of the propelling nozzle flaps 18 and the inner surface of the divergent exhaust duct 20 from some available source, such as the turbojet engine compressor through line 72. With the afterburner in operation, the flaps 18 of the propelling nozzle are in their open position, as shown in phantom in Figs. 1 and 2, and the cooling air passes from line 72 into chamber 74, thence, as shown by the path of arrows, along the inner surface of flaps 18 and divergent exhaust duct 20 to form a boundary layer of relatively cool air between the hot gas of the afterburner and the duct wall.

*Operation*

With the turbojet engine operating with an afterburner but with the afterburner "off," it is desirable to have a small jet area for the gases of the engine to exhaust through. The propelling or jet exhaust nozzle provides the small jet area when in its closed position. The closed position of the nozzle is shown in Figs. 1, 2 and 3. To cause the nozzle to assume the closed position, a pressurized fluid, such as compressed air is piped through line 56 into cylinder 52 and causes piston 50 to move to its far left position as shown in Fig. 1. Piston 50, through rod 44 causes ring 36 to assume its farthest left position as shown in Fig. 1. This causes link 38 to pivot about bracket 42 and extend inwardly in a substantially radial plane. As link 38 extends inwardly it causes flap 18 to pivot about bolt 34 and assume its non-afterburning, or closed or small jet area position.

By a control means of the servo piston type (not shown), a pressurized fluid can be introduced through either line 54 or 56. This control means vents line 56 to atmosphere when line 54 is pressurized and, in turn, vents line 54 to atmosphere when line 56 is pressurized. Since line 72 is teed into line 54, the pressurized cooling fluid, such as air, is introduced through line 72 to cool the inner surfaces of flaps 18 and the inner surface of divergent exhaust duct 20, at the same time that the pressurized fluid passes through line 54 to move piston 50 to its farthest right position, thereby moving actuating ring 36 to the right to move flaps 18 to their outward position to form a smooth convergent-divergent exhaust nozzle by connecting converging duct 14 with diverging duct 20.

When in the closed position, the propelling nozzle, together with convergent fluid outlet 14, forms a convergent exhaust nozzle. This type of nozzle is desirable for moderate flight speeds for the convergent exhaust nozzle provides optimum thrust generation when the velocity of the exhaust gases relative to the nozzle is substantially subsonic. This is the usual condition during non-afterburner operation.

When the afterburner is ignited, the pressurized fluid, such as compressed air enters cylinder 52 through line 54 and causes piston 50 to move to its far right position. Piston 50, through rod 44, causes ring 36 to move to its far right position, as shown in phantom in Figs. 1 and 2. As ring 36 moves to this position, link 38 pivots about bracket 42 and moves outwardly in a substantially radial plane. As links 38 move outward radially, they cause flaps 18 to move outwardly, pivoting about bolt 34 until their inner surfaces become flush with the airflow path formed by convergent fluid outlet 14 and divergent fluid outlet 20. With the propelling nozzle in this position, it unites with ducts 14 and 20 to form a smooth surfaced convergent-divergent exhaust nozzle. During afterburner operation, due to high flight speed, the relative velocity of the exhaust gases to the jet nozzle increases and becomes supersonic. The convergent-divergent nozzle gives optimum thrust generation under these conditions.

At the same time that compressed air is supplied through line 54, it also passes through line 72 and then follows the route of the arrow path shown in Figs. 1 and 2 to serve to cool the inner surfaces of the flaps 18 and divergent exhaust duct 20. It may be noted that the flaps 18 are hollow and are open at both ends, as indicated, so that cooling air may flow through these flaps in addition to flowing over the surfaces thereof as indicated.

The device is especially usable on turbojets where the flow from the discharge nozzle might exceed sonic speed under certain conditions such as maximum power operation. It will be apparent that the device will function in the same way as above described to give a convergent-divergent nozzle at supersonic flows and will be reduced in area to give a convergent nozzle for subsonic flow. The device may also be operated as a multiple position nozzle through suitable control of actuating fluid to the piston 50 as will be apparent.

Although a specific nozzle has been shown and described herein for purpose of illustration, it will be evident to those skilled in the art that the invention is capable of various modifications and adaptations within the scope of the appended claims.

I claim:

1. A convergent fluid duct, a series of overlapping flaps pivotally attached adjacent to the downstream end of said duct, a divergent fluid duct downstream of said convergent duct and means to move said flaps from a position forming a connecting duct between said convergent duct and said divergent duct into a position to form a smaller area nozzle.

2. A convergent fluid duct, a first divergent fluid duct spaced downstream from said convergent duct, overlapping flaps pivotally attached to said convergent duct adjacent its downstream end and means for moving said flaps outwardly to form a second divergent duct which blends with and forms a continuous divergent duct with said first divergent duct.

3. A convergent fluid duct, a first divergent fluid duct spaced downstream from said convergent duct, overlapping flaps pivotally attached to said convergent duct adjacent its downstream end, and means for moving said flaps outwardly to form a second divergent duct which blends with and forms a continuous divergent duct with said first duct so that a smooth convergent-divergent fluid passage is formed, said means also being capable of moving said flaps inwardly to form a convergent fluid passage.

4. A convergent fluid duct, a first divergent fluid duct spaced downstream of said convergent duct and having a greater upstream area than the downstream area of said convergent duct, overlapping flaps pivotally attached to said convergent duct adjacent its downstream end, means for moving said flaps between an outer position in which the flaps form a second divergent duct which blends with and forms a continuous divergent duct with said first divergent duct so that a smooth convergent-divergent fluid passage is formed by said convergent duct, said flaps and said first divergent duct, said means also being capable of moving said flaps inwardly to form a smooth smaller area convergent nozzle with said convergent duct.

5. A variable area exhaust nozzle comprising a convergent exhaust duct, a series of overlapping flaps pivotally attached to said duct, a divergent exhaust duct downstream of said first duct, said flaps in the outer position lying in the wall surface of said ducts to provide a convergent-divergent nozzle, said flaps being movable between said outer position and an inner position in which they form a convergent nozzle at the end of the convergent duct, and means for moving said flaps.

6. A convergent fluid passage, a divergent fluid outlet downstream of said first passage, overlapping flaps of spaced double wall construction pivotally attached to said first passage, means for moving said flaps outwardly into the wall of said passages so that a smooth convergent-divergent fluid passage is formed and means responsive to movement of said flaps into said wall for cooling the inner surfaces of said flaps.

7. A convergent fluid passage, a divergent fluid outlet downstream of said first passage, overlapping flaps of spaced double wall construction pivotally attached to said first passage, means for moving said flaps outwardly into the wall of said passages so that a smooth convergent-divergent fluid passage is formed, and means responsive to movement of said flaps into said wall for cooling the inner surfaces of said flaps and the inner surface of said divergent fluid passage.

8. A variable area exhaust nozzle comprising a convergent exhaust duct, a series of overlapping flaps of spaced double wall construction pivotally attached to said duct, a divergent exhaust duct spaced from and downstream of said first duct, means for moving said flaps outwardly into said divergent exhaust duct so that a smooth convergent-divergent exhaust nozzle is formed and means responsive to the movement of said flaps into said duct for cooling the inner surfaces of said flaps.

9. A variable area exhaust nozzle comprising a convergent exhaust duct, a series of overlapping flaps of spaced double wall construction pivotally attached to said duct, a divergent exhaust duct downstream of said first duct, means causing said flaps to move so that an exhaust area of more than one size can be formed, means for cooling the inner surfaces of said flaps and said divergent exhaust duct by passing cooling air over said inner surfaces, and means for moving said flaps outwardly into said divergent exhaust duct so that a smooth convergent-divergent exhaust nozzle is formed.

10. A variable area exhaust nozzle comprising a convergent exhaust duct having a support ring attached to the downstream end thereof, a series of overlapping flaps of spaced double wall construction pivotally attached to said support ring, a divergent exhaust duct spaced from and downstream of said first duct, means for moving said flaps outwardly into said divergent exhaust duct so that a smooth convergent-divergent exhaust nozzle is formed, said means also being capable of moving said flaps inwardly to form a convergent exhaust nozzle.

11. A variable area exhaust nozzle comprising a convergent exhaust duct having a support ring attached to the downstream end thereof, a series of overlapping flaps pivotally attached to said support ring, a divergent exhaust duct spaced from and downstream of said support ring a distance substantially that of the length of the flaps, and means for moving said flaps outwardly to bring the free ends of the flaps into alignment with said divergent exhaust duct so that a smooth convergent-divergent exhaust nozzle is formed, said means also being capable of moving said flaps inwardly to form a convergent exhaust nozzle constituting a downstream extension of the convergent exhaust duct, said convergent exhaust nozzle being smaller in area than the downstream end of the convergent duct, said nozzle having an exhaust area which is substantially circular and in one plane perpendicular to the axis of said exhaust ducts.

12. The combination with a turbojet engine, an afterburner having a convergent exhaust duct having a support ring attached to the downstream end thereof, and a divergent exhaust duct spaced from and downstream of said first exhaust duct, a series of overlapping flaps pivotally attached to said support ring, and movable to form a smooth wall connecting said ducts to form a convergent-divergent exhaust nozzle, and means for moving said flaps so that a convergent exhaust nozzle can be formed.

13. In combination, a turbojet engine, an afterburner with a convergent exhaust duct having a support ring attached to the downstream end thereof, a divergent exhause duct spaced from and downstream of said first exhaust duct, a series of overlapping flaps of spaced double wall construction pivotally attached to said support ring and means for moving said flaps so that a convergent exhaust nozzle will be formed having a substantially circular exhaust area in one plane perpendicular to the centerlines of said ducts, said means also being capable of moving said flaps so that a smooth surfaced convergent-divergent exhaust nozzle will be formed and means for passing cooling air over the inner surfaces of the divergent portion of said convergent-divergent exhaust nozzle.

14. An exhaust nozzle for use in a turbojet engine which operates at various flight speeds including substantially supersonic flight speed, an afterburner, said nozzle comprising a series of flaps with sealing means therebetween, each of said flaps being in pivotal engagement with the convergent exhaust duct of said afterburner, actuating means consisting of a compressed air actuated piston, an actuating rod connecting said piston to an actuating ring, said ring being connected to each of said flaps by links, said actuating means being capable of moving said flaps inwardly so as to form a convergent exhaust nozzle for optimum thrust generation during non-afterburning operation of said engine when the velocity of the exhaust gases relative to said convergent nozzle is substantially subsonic and said actuating means also being capable of moving said flaps outwardly so as to form a convergent-divergent exhaust nozzle with said convergent exhaust duct and a divergent exhaust duct which is attached to said convergent nozzle and downstream thereof, said convergent-divergent exhaust nozzle affording optimum thrust generation during afterburner operation when the speed of the exhaust gases relative to said convergent-divergent nozzle is substantially supersonic.

15. In combination, a convergent fluid duct having a support ring attached to the downstream end thereof, a divergent fluid duct spaced from and downstream of said convergent duct, a series of overlapping flaps of spaced double wall construction pivotally attached to said support ring, flap actuating means comprising an actuating ring, at least one hydraulic piston-cylinder unit, an actuating rod connecting said piston to said actuating ring, and a plurality of links pivotally attached to and connecting each of said flaps with said actuating ring, said actuating means being capable of moving said plurality of flaps inwardly to form a converging exhaust nozzle with said converging duct and also being capable of moving said flaps outwardly to form a smooth walled passage connecting said convergent and said divergent exhaust ducts to form a smooth convergent-divergent exhaust nozzle, and means responsive to the movement of said flaps to pass cooling air over the inner surfaces of said flaps and said divergent duct when said flaps are in their outward position.

16. In combination, a convergent fluid duct having a support ring attached to the downstream end thereof, a divergent fluid duct spaced from and downstream of said convergent duct, a series of overlapping flaps of spaced double wall construction pivotally attached to said support ring, flap actuating means comprising an actuating ring, at least one hydraulic piston-cylinder unit, an actuating rod connecting said piston to said actuating ring and a plurality of links pivotally attached to and connecting each of said flaps with said actuating ring, means to support said actuating ring, said actuating means being capable of moving said plurality of flaps inwardly to form a converging exhaust nozzle with said converging duct and also being capable of moving said flaps outwardly to form a smooth walled passage connecting said convergent and said divergent exhaust ducts to form a smooth convergent-divergent exhaust nozzle, and means responsive to the movement of said flaps to pass cooling air over the inner surfaces of said flaps and said divergent duct when said flaps are in their outward position.

17. In combination, a convergent fluid duct having a support ring attached to the downstream end thereof, a divergent fluid duct spaced from and downstream of said convergent duct, a series of overlapping flaps of spaced double wall construction pivotally attached to said support ring, flap actuating means comprising an actuating ring, at least one hydraulic piston-cylinder unit, an actuating rod connecting said piston to said actuating ring, and a plurality of links pivotally attached to and connecting each of said flaps with said actuating ring, means to support said actuating rods, said actuating means being capable of moving said plurality of flaps inwardly to form a converging exhaust nozzle with said converging duct and also being capable of moving said flaps outwardly to form a smooth walled passage connecting said convergent and said divergent exhaust ducts to form a smooth convergent-divergent exhaust nozzle, and means responsive to the movement of said flaps to pass cooling air over the inner surfaces of said flaps and said divergent duct when said flaps are in their outward position.

18. A convergent fluid passage, a divergent fluid passage downstream of said first passage, overlapping flaps pivotally attached to said first passage, means for moving said flaps outwardly into the wall of said passages so that a smooth convergent-divergent fluid passage is formed and means responsive to movement of said flaps into said wall for cooling the inner surfaces of said flaps.

19. A convergent fluid passage, a divergent fluid passage downstream of said first passage, overlapping flaps pivotally attached to said first passage, means for moving said flaps outwardly into the wall of said passages so that a smooth convergent-divergent fluid passage is formed, and means responsive to movement of said flaps into said wall for cooling the inner surfaces of said flaps and the inner surface of said divergent fluid passage.

References Cited in the file of this patent

UNITED STATES PATENTS

| | | |
|---|---|---|
| 1,225,242 | Guerin | May 8, 1917 |
| 2,094,707 | Jones | Oct. 5, 1937 |
| 2,479,776 | Price | Aug. 23, 1949 |
| 2,540,594 | Price | Feb. 6, 1951 |
| 2,597,253 | Melchior | May 20, 1952 |
| 2,603,062 | Weiler et al. | July 15, 1952 |
| 2,637,164 | Robson et al. | May 5, 1953 |

FOREIGN PATENTS

| | | |
|---|---|---|
| 775,616 | France | Oct. 15, 1934 |